United States Patent
McGourthy, Sr. et al.

[11] Patent Number: 6,095,294
[45] Date of Patent: Aug. 1, 2000

[54] SIMPLIFIED DEADMAN BRAKE

[75] Inventors: John D. McGourthy, Sr., 5209 W. River Trail Ct., Mequon, Wis. 53092; John D. McGourthy, Jr., Mequon, Wis.; Jon A. DeBoer, Port Washington, Wis.; Marco J. Zach, Mequon, Wis.

[73] Assignee: John D. McGourthy, Sr., Mequon, Wis.

[21] Appl. No.: 09/086,911

[22] Filed: May 29, 1998

[51] Int. Cl.[7] .................................................. B60T 13/04
[52] U.S. Cl. .......................... 188/166; 56/11.3; 477/204
[58] Field of Search ................................. 188/166, 2 D, 188/105; 56/11.3; 192/215, 220.1; 477/204, 203, 207, 209

[56] References Cited

U.S. PATENT DOCUMENTS

| | | |
|---|---|---|
| 3,026,665 | 3/1962 | Hoff . |
| 3,224,474 | 12/1965 | Bloom . |
| 4,018,449 | 4/1977 | Anderson . |
| 4,322,935 | 4/1982 | Poehlman . |
| 4,326,368 | 4/1982 | Hoff . |
| 4,372,433 | 2/1983 | Mitchell et al. ............. 192/18 R |
| 4,394,893 | 7/1983 | Kronich et al. . |
| 4,419,857 | 12/1983 | Smith . |
| 4,466,233 | 8/1984 | Thesman . |
| 4,519,486 | 5/1985 | Hermanson ............. 192/3 S |
| 4,730,710 | 3/1988 | Granitz ............. 56/11.3 S |
| 4,757,885 | 7/1988 | Kronich . |
| 4,760,685 | 8/1988 | Smith . |
| 4,889,213 | 12/1989 | Roller . |
| 4,907,401 | 3/1990 | Nemoto et al. . |
| 4,979,596 | 12/1990 | Roller . |
| 5,040,644 | 8/1991 | Turczyn et al. . |
| 5,086,890 | 2/1992 | Turczyn et al. ............. 188/166 |

*Primary Examiner*—Robert J. Oberleitner
*Assistant Examiner*—Pamela J. Lipka
*Attorney, Agent, or Firm*—Andrus, Sceales, Starke & Sawall

[57] ABSTRACT

A deadman brake (62) is provided for stopping a rotating member driven by a power source, including the flywheel (46) of an internal combustion engine (42) of a lawnmower (40). A cantilever leaf spring (94) has a root end (96) attached to an engine-mounted bracket (68), and a distal end (98) movable toward and away from the flywheel (46). A brake pad (100) is attached to the cantilever leaf spring (94) and normally engages the flywheel (46) under self-bias of the cantilever leaf spring (94). A cable system (56, 58) is coupled by a transfer member (72, 134) to the cantilever leaf spring (94) and is actuated to disengage the brake pad (100) from the flywheel (46). The transfer member (72, 134) is a double pivot (106, 126) member providing universal right hand and left hand direction actuation application.

16 Claims, 5 Drawing Sheets

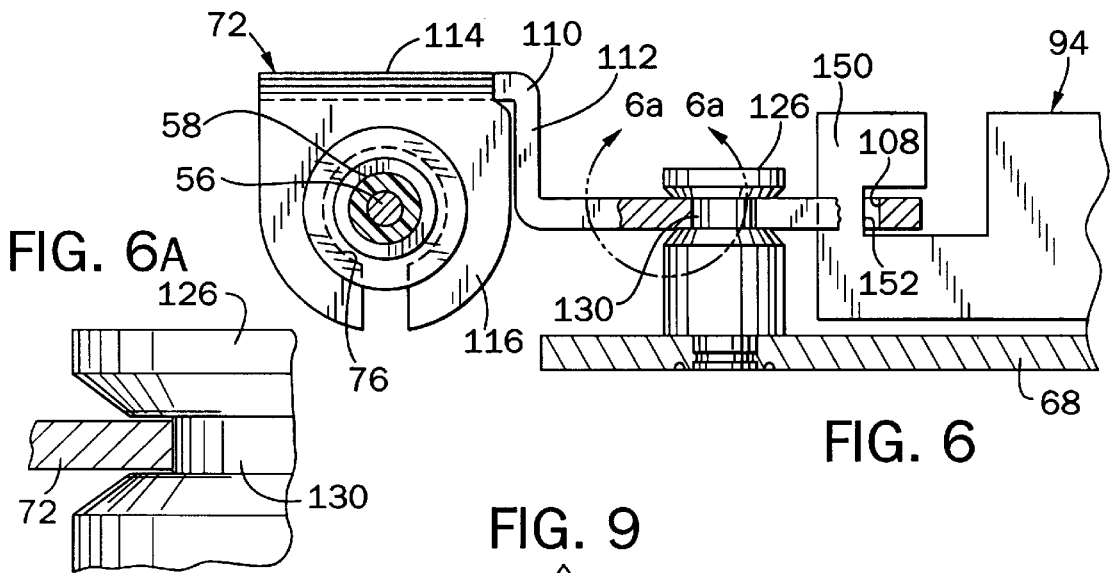
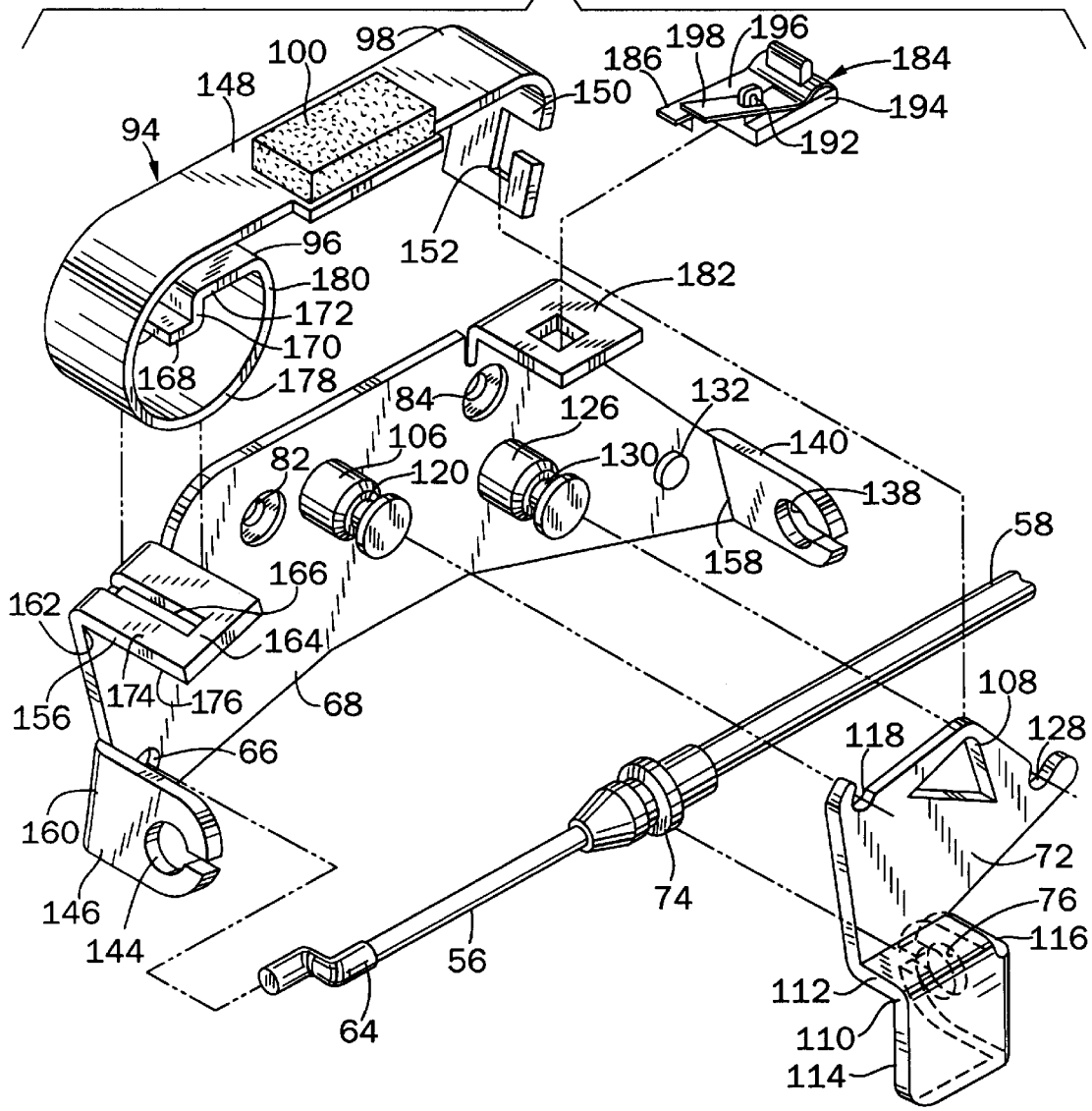

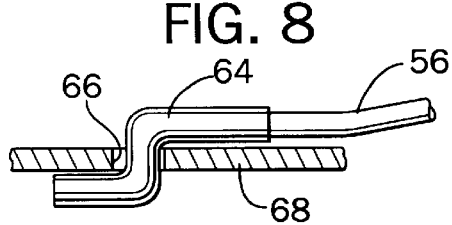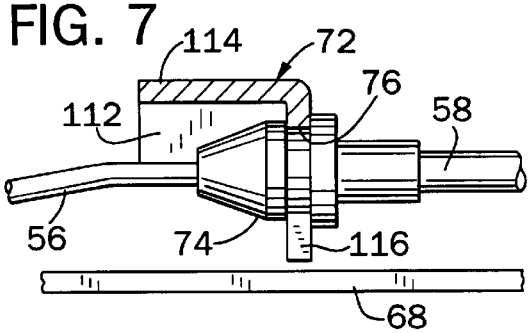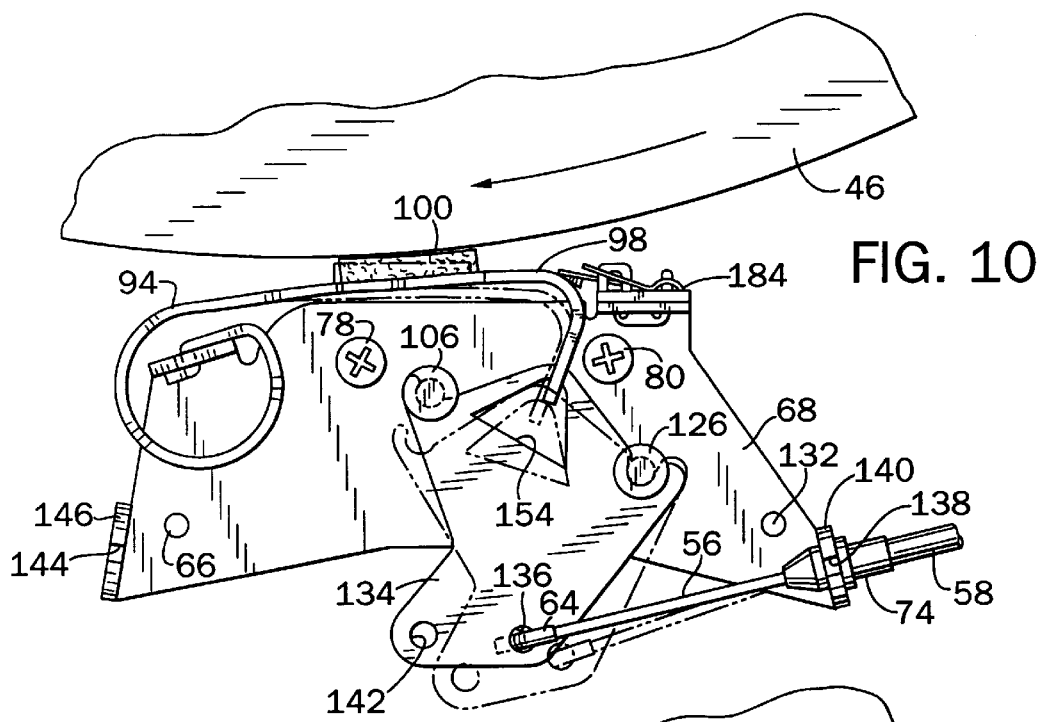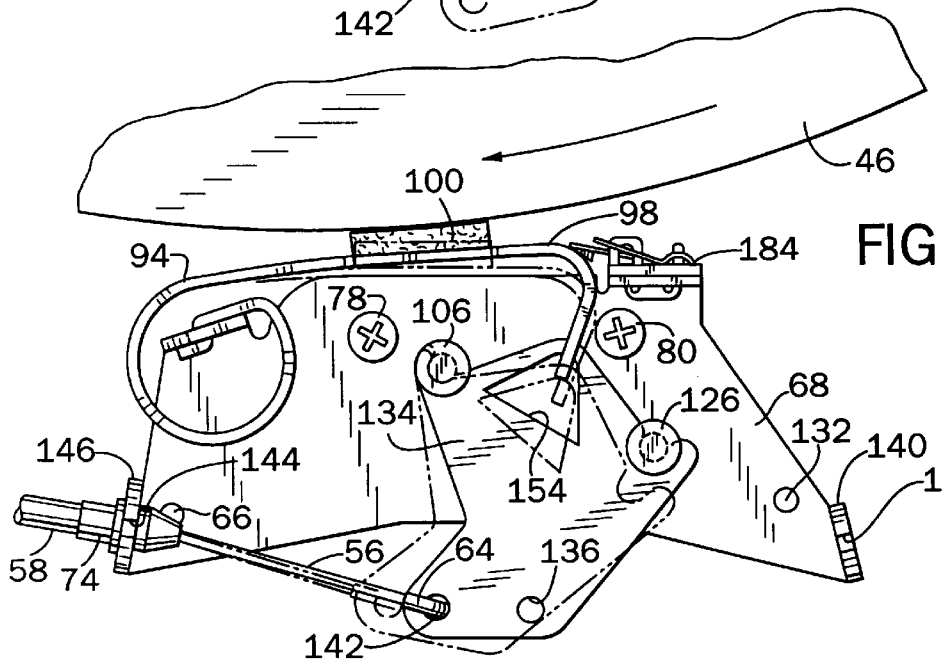

SIMPLIFIED DEADMAN BRAKE

BACKGROUND AND SUMMARY

The invention relates to a deadman brake, for a lawnmower engine flywheel.

Deadman brakes for lawnmowers are known in the art. The lawnmower handle typically has a deadman brake bar pivoted to a handlebar and squeezable together by the operator, which actuates a cable system to in turn actuate the brake to a non-braking position wherein a brake pad disengages the flywheel of the engine. When the operator releases the deadman brake bar on the handlebar, the brake is actuated to a braking position, wherein the brake pad engages and stops the flywheel.

It is known in the prior art to include an ignition kill switch with the brake. When the brake is in its braking position, the kill switch connects the ignition circuit to ground, bypassing the spark plug, such that the latter does not fire. When the brake is in its non-braking position, the kill switch opens the circuit to ground, and the spark plug fires or discharges in normal manner.

The present invention arose from development efforts directed toward significantly simplifying and reducing the cost of the above described brakes. The invention enables particularly simple and cost effective hardware, and efficient operation. The invention is characterized by a minimum number of parts, and ease of forming operations, resulting in significant cost reduction.

BRIEF DESCRIPTION OF THE DRAWINGS

FIG. 6 is a view taken along line 6—6 of FIG. 4.

FIG. 6a is a view taken along line 6a—6a of FIG. 6.

FIG. 7 is a view taken along line 7—7 of FIG. 5.

FIG. 8 is a view taken along line 8—8 of FIG. 5.

FIG. 9 is an exploded perspective view of the brake of FIG. 4.

FIG. 10 is a view like FIG. 4 and shows an alternate embodiment.

FIG. 11 is a view like FIG. 10 and shows a further embodiment.

DETAILED DESCRIPTION

Figure 1:
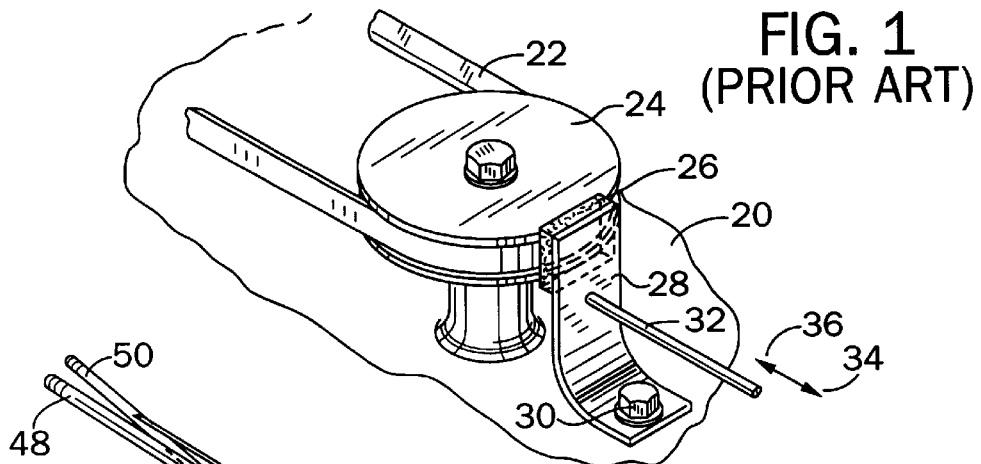
FIG. 1 is a perspective view of a brake known in the prior art.

FIG. 1 illustrates prior art and shows the mower deck 20 of a lawn tractor having a drive belt 22 around a pulley 24 engaged by a brake pad 26 attached to a cantilever leaf spring 28 mounted to mower deck 20 by bolt 30. Rod 32 is connected to leaf spring 28 for releasing the brake. When rod 32 is pulled rightwardly as shown at arrow 34, leaf spring 28 is deflected rightwardly and brake pad 26 moves away from and disengages pulley 24. When rod 32 is released, it moves leftwardly as shown at arrow 36 due to the bias of leaf spring 28, and brake pad 26 engages pulley 24 to stop rotation of the pulley, to in turn stop belt 22 and another pulley connected thereto (not shown) and in turn stop rotation of a cutting blade (not shown) connected to such other pulley.

Figure 2:
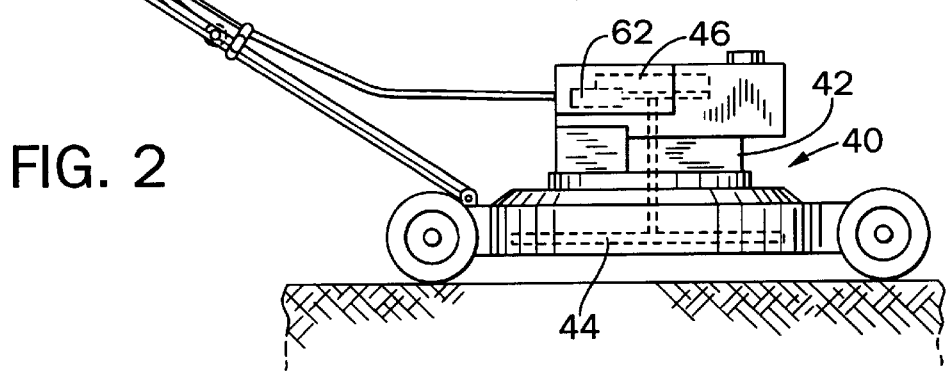
FIG. 2 is a side view of a lawnmower.
Figure 3:
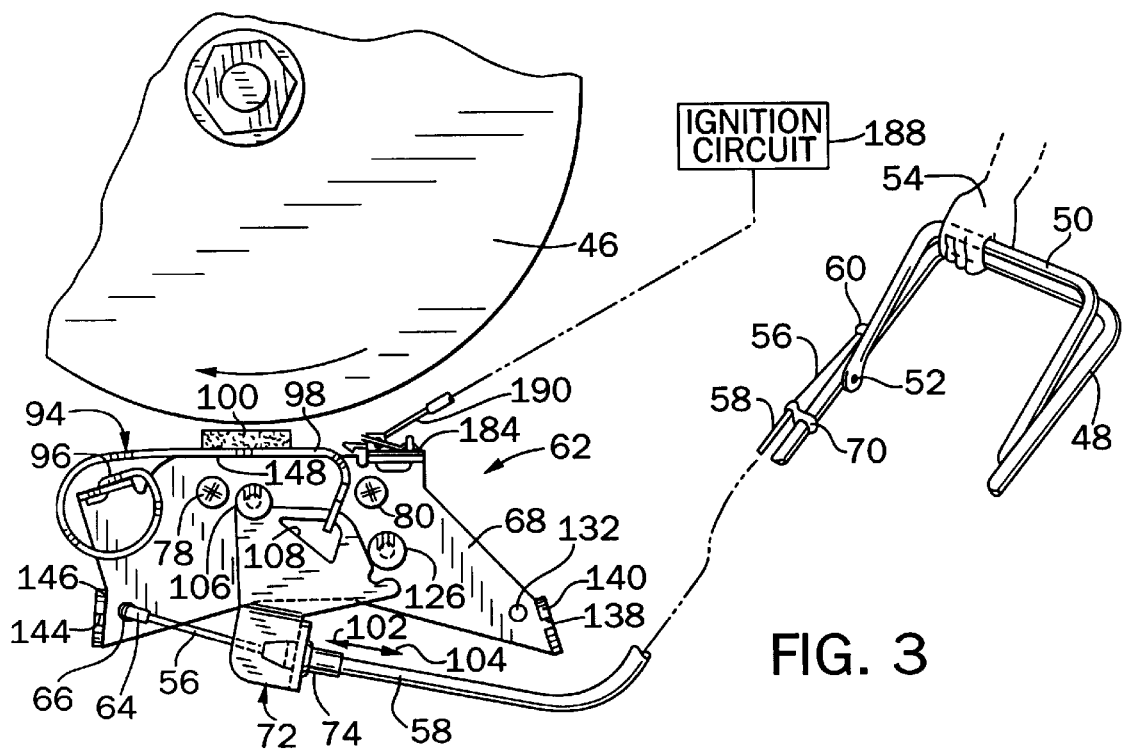
FIG. 3 is a top view of a brake in accordance with the invention.

FIG. 2 shows a lawnmower 40 having a power source provided by an internal combustion engine 42 for rotating a mower blade 44. The engine also drives an upper flywheel 46. The lawnmower includes a handlebar 48 for pushing the lawnmower, and a deadman brake bar 50 pivoted to the handlebar at pivot 52 and squeezed by the operator's hand 54, FIG. 3, which in turn actuates the cable system provided by cable 56 and live conduit or sheath 58. Cable 56 extends through live conduit 58 and is attached to deadman bar 50 at attachment 60. Cable 56 and live conduit 58 actuate brake 62 to stop rotation of the rotating member provided by flywheel 46 driven by engine 42, to halt rotation of blade 44.

Figure 12A:
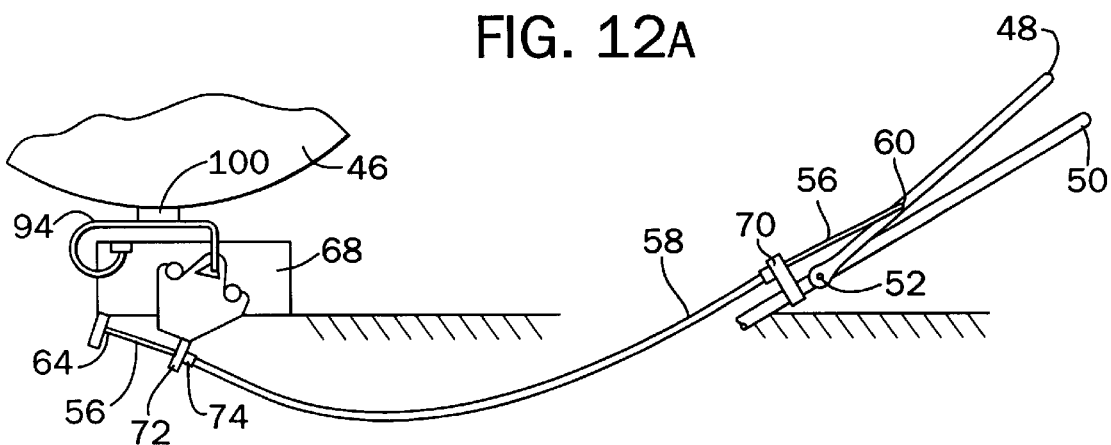
FIGS. 12a and 12b schematically illustrate live conduit operation.
Figure 12B:
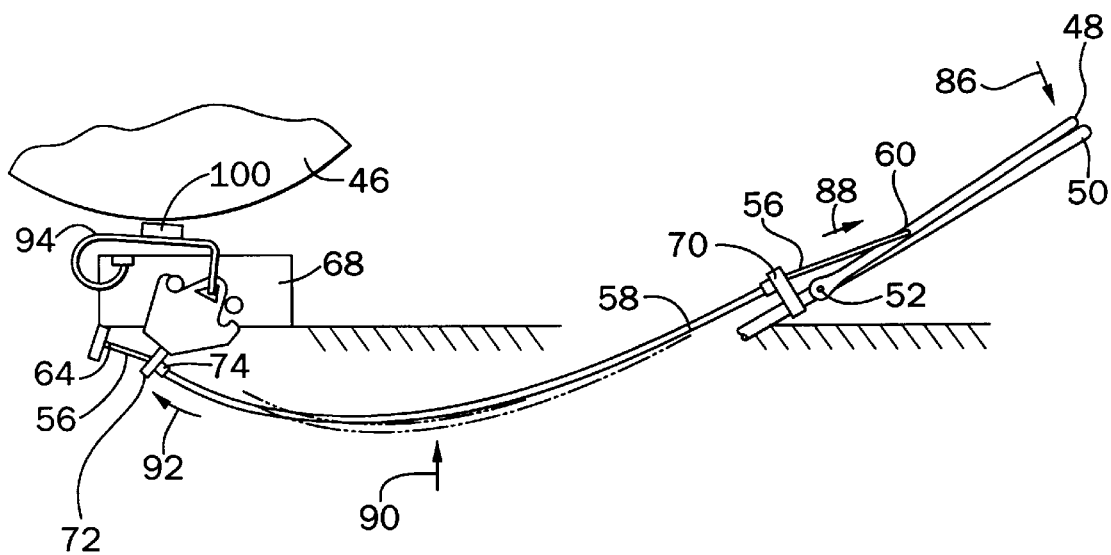

The cable system itself is known in the prior art, and will be only briefly described. One end of cable 56 is fixed at 60 to deadman bar 50, and the other end of cable 56 is fixed at hook 64, FIGS. 3, 8 and 9, extending through and retained in aperture 66 of brake bracket 68. Live conduit 58 is a sheath fixed at one end to handlebar 48 at attachment 70, and fixed at the other end to a movable pivotable transfer member 72 of the brake. The end of live conduit sheath 58 has a grommet 74 retained in slotted aperture 76 of transfer member 72, FIGS. 9 and 7. Cable 56 is slidable through live conduit sheath 58 and grommet 74. Brake attachment bracket 68 is attached to engine 42 at screws 78 and 80 extending through respective apertures 82 and 84, FIGS. 3 and 9. When deadman bar 50 is squeezed by the operator toward handlebar 48 as shown at arrow 86, FIG. 12b, the right end of cable 56 is pulled rightwardly as shown at 88. Since the left end of cable 56 is anchored in fixed relation to bracket 68 and is stationary, slack in the cable is taken up and it moves as shown at 90 to a tauter position, to enable the noted rightward movement at 88 of the right end of cable 56. As the cable assumes the noted tauter position, the left end of live conduit sheath 58 moves leftwardly as shown at 92, since the right end of live conduit sheath 58 is fixed at 70 to handlebar 50 and is stationary. Leftward movement at 92 of the left end of live conduit sheath 58 moves brake member 72 leftwardly to pivot the movable brake member to a non-braking position, to be described. Upon release of deadman bar 48, FIG. 12a, the above sequence is reversed, and the cable returns to a slacker, less taut, condition, whereby the left end of live conduit sheath 58 is allowed to move rightwardly due to the bias applied to brake member 72 by cantilever leaf spring 94, to be described, and the brake returns to a braking condition. In other embodiments, FIGS. 10 and 11, to be described, a non-live conduit is used, wherein the cable is attached to the movable brake member. In these latter embodiments, each end of the sheath is fixed and stationary. The present invention may be used with either type of cable system, and such versatility is a desirable feature of the present invention.

In the present invention, brake 62, FIGS. 3–9, includes the noted attachment bracket 68 attached to engine 42 at screws 78 and 80. A cantilever leaf spring 94 has a root end 96 mounted to bracket 68, and a distal end 98 movable toward and away from flywheel 46. A brake pad 100 is thermally adhesively bonded to the brake shoe provided by leaf spring 94 and normally engages flywheel 46 under the self-bias of cantilever leaf spring 94, FIG. 4. Live conduit sheath 58 is coupled to cantilever leaf spring 94 through pivotable transfer member 72, to be described, and is movable in a first direction, leftwardly in FIGS. 3 and 5 as shown at arrow 102, moving distal end 98 of cantilever leaf spring 94 away from flywheel 46, against the bias of cantilever leaf spring 94, such that brake pad 100 disengages the flywheel. Live conduit sheath 58 is movable in a second direction, rightwardly in FIGS. 3 and 4 as shown at arrow 104, permitting distal end 98 of cantilever leaf spring 94 to move toward flywheel 46, FIG. 4, due to the bias of cantilever leaf spring 94, such that brake pad 100 engages the flywheel. Distal end 98 of cantilever leaf spring 94 moves along an arc which lies in a plane which is coplanar with the plane of rotation of flywheel 46.

The brake includes the noted transfer member 72 mounted to bracket 68 and connected to sheath 58 and to cantilever leaf spring 94 and translating movement of the cable system into movement of distal end 98 of the cantilever leaf spring. Transfer member 72 pivots on bracket 68 about trunnion 106 extending from the bracket. Transfer member 72 is a generally triangular shaped member having a triangular shaped opening 108, FIG. 9, hooked to cantilever leaf spring 94, to be described. Transfer member 72 has a lower flange 110 bent outwardly at 112 and then downwardly at 114 and then back inwardly at 116 to engage the cable system at slotted aperture 76, FIG. 7, engaging grommet 74 of sheath 58 in fixed relation. The transfer member has a first upper notch at 118 for engaging recessed annular groove 120 of trunnion 106 to form a first pivot point. Transfer member 72 pivots at notch 118 about trunnion 106 in a clockwise rotational direction as shown at arrow 122, FIG. 5, moving distal end 98 of cantilever leaf spring 94 away from flywheel 46 such that brake pad 100 disengages flywheel 46. Transfer member 72 pivots on bracket 68 at notch 118 and trunnion 106 in the opposite rotational direction, i.e. counterclockwise as shown at arrow 124 to the position in FIG. 4, permitting distal end 98 of cantilever leaf spring 94 to move toward flywheel 46 such that brake pad 100 engages flywheel 46.

Transfer member 72 is a double pivot member pivoting on bracket 68 at a first pivot point provided by trunnion 106, and also pivoting on bracket 68 at a second pivot point provided by trunnion 126 extending from the bracket and spaced from trunnion 106. Transfer member 72 includes a second upper notch 128, FIG. 9, engaging recessed annular groove 130 of trunnion 126 to provide the noted second pivot point. The double pivot enables the cable system orientation to be reversed, i.e. the cable end hook 64 may instead be mounted to the right side of bracket 68 at aperture 132, with sheath 58 extending to transfer member 72 from the left, rather than the right as in FIG. 3, to enable actuation of the brake to a released non-braking position by a rightward movement of sheath end grommet 74 as shown at arrow 104, rather than a leftward movement as shown at arrow 102. The double pivot enabling reverse cable system orientation is also illustrated in FIGS. 10 and 11, to be described, wherein a rightward cable pull direction in FIG. 10 to the dashed line position actuates the brake to a released non-braking condition, and a leftward cable pull direction in FIG. 11 to the dashed line position actuates the brake to a released non-braking position. The double pivot enabling reverse cable system orientation is desirable for some manufacturers who want the versatility of right or left directional movement depending upon various bracket mounting orientations in various lawnmowers. This is desirable for a supplier because a single brake provides universal application, without having to stock separate right hand direction and left hand direction deadman brakes.

Right hand pull and left hand pull cable system orientations are illustrated in FIGS. 10 and 11, which also show the noted alternate cable system. FIGS. 10 and 11 use like reference numerals from FIGS. 2–9 where appropriate to facilitate understanding.

In FIG. 10, transfer member 134 is similar to transfer member 72 of FIG. 9 except that lower flange 110 has been deleted. Instead, the lower part of transfer member 134 has an aperture 136 receiving the hook end 64 of cable 56. Grommet 74 of sheath 58 is mounted in slotted aperture 138 of bracket flange or stanchion 140 and is stationary. When deadman bar 50 is squeezed toward handlebar 48, FIG. 3, the left end of cable 56 at hook 64 moves rightwardly in FIG. 10 to the position shown in dashed line. This pivots transfer member 134 counterclockwise about pivot point trunnion 126 to move the distal end 98 of cantilever leaf spring 94 away from flywheel 46 to disengage brake pad 100 therefrom. When deadman bar 50 is released, the left end of cable 56 at hook 64 returns leftwardly in FIG. 10 to the position shown in solid line due to the bias of cantilever leaf spring 94 pivoting transfer member 134 clockwise about trunnion 126. The embodiment in FIG. 10 thus provides a right hand pull cable system orientation.

In FIG. 11, end hook 64 of cable 56 is mounted in lower aperture 142 of transfer member 134, and the end of sheath 58 at grommet 74 is mounted in slotted aperture 144 of lower left flange or stanchion 146 of bracket 68 and is stationary. When deadman bar 50 is squeezed toward handlebar 48, the end of cable 56 at hook 64 moves leftwardly in FIG. 11 to the position shown in dashed line to pivot transfer member 134 clockwise about pivot point trunnion 106 to move distal end 98 of cantilever leaf spring 94 downwardly away from flywheel 46 to disengage brake pad 100 therefrom. When deadman bar 50 is released, the end of cable 56 at hook 64 moves rightwardly due to the bias of cantilever leaf spring 94 pivoting transfer member 134 counterclockwise about trunnion 106. The arrangement in FIG. 11 thus provides a left hand pull cable orientation system.

The cable systems in FIGS. 10 and 11 are direct cable pull type systems wherein each end of sheath 58 is fixed and stationary, and the ends of cable 56 move. In each of the embodiments in FIGS. 3–11, upon release of deadman bar 50, the transfer member 72 or 134 pivots to a brake actuated position due to the bias of cantilever leaf spring 94 such that brake pad 100 engages flywheel 46 and stops rotation thereof.

Trunnions 106 and 126 provide first and second pivot points for the noted double pivot action. Cantilever leaf spring 94 extends beyond brake pad 100 to distal end 98 and then turns at the distal end away from flywheel 46 and is connected to transfer member 72, FIGS. 3 and 9, or to transfer member 134, FIGS. 10 and 11, at a point between trunnions 106 and 126, to be further described. Brake pad 100 is attached to cantilever leaf spring 94 at a location between root end 96 and the point of connection of transfer member 72 or 134 to the cantilever leaf spring.

Cantilever leaf spring 94 includes the noted root end 96 mounted to bracket 68, and an extension span 148 extending from the root end to the distal end of the cantilever leaf spring. Distal end 98 extends from extension span 148 and is bent and turned at 150, FIG. 9, in a direction away from flywheel 46 and has a hook portion 152 connected to transfer member 72 at aperture 108. Pivot point 126 of transfer member 72 is between cable connection point 132 and the point of connection 152 of turned distal end 150 of cantilever leaf spring 94 to transfer member 72 at aperture 108. Pivot point 126 of transfer member 134, FIGS. 10 and 11, is between cable guide passage 138 and the point of connection 152 of turned distal end 150 of cantilever leaf spring 94 to transfer member 134 at aperture 154. Pivot point 106 of transfer member 72, FIG. 9, is between cable guide connection point 66 and the point of connection 152 of turned distal end 150 of cantilever leaf spring 94 to transfer member 72 at aperture 108. Pivot point 106 of transfer member 134, FIGS. 10 and 11, is between cable guide passage 144 and the point of connection 152 of turned distal end 150 of cantilever leaf spring 94 to transfer member 134 at aperture 154.

The cable guide structure 66, 76, 132, 138, 144, guides the cable system components for movement generally in right and left translational directions. The cable and sheath extend along an axis which is parallel to a tangent of an arc of rotation of flywheel 46. Such axis lies in the plane of rotation of flywheel 46. The extension of cantilever leaf spring 94 from its root end to its distal end along extension span 148 lies in the plane of rotation of flywheel 46.

Bracket 68 is an integral member having integrally turned stanchions 140 and 146, FIG. 9, extending therefrom and forming the noted flanges with cable guide passages 138 and 144 therethrough. Bracket 68 has another integrally turned stanchion 156 extending therefrom and providing a mounting platform mounting cantilever leaf spring 94. Stanchions 140, 146, 156 are integrally turned along bend lines 158, 160, 162 nonparallel to each other.

Stanchion 156 mounts root end 96 of cantilever leaf spring 94 and includes a platform 164 having a slot 166 therethrough. Root end 96 of cantilever leaf spring 94 has a shallow S-shape having a first segment 168 extending along platform 164, a second segment 170 extending through slot 166, and a third segment 172 extending along platform 164. Third segment 172 extends beyond platform 164 to the distal end of the cantilever leaf spring, to be described. Platform 164 has a topside 174 facing toward flywheel 46, and an underside 176 facing away from rotating member 46. First segment 168 of shallow S-shaped root end 96 of the cantilever leaf spring extends along underside 176 of platform 164. Third segment 172 of shallow S-shaped root end 96 of the cantilever leaf spring extends along topside 174 of platform 164.

Cantilever leaf spring 94 extends from root end 96 along a curve 178, FIG. 9, and loops around mounting platform 164 and then extends along extension span 148 to brake pad 100. The cantilever leaf spring extends beyond brake pad 100 at extension span 148 to distal end 98 and then turns at the distal end away from flywheel 46 and extends at turned away end 150 toward the axis of the movement of the cable system. The looping portion of the cantilever leaf spring at 178 is C-shaped and extends from root end 96 initially away from flywheel 46 at 180 and then curls around root end 96 to extension span 148 extending to distal end 98. Extension span 148 extends parallel to a tangent of an arc of rotation of flywheel 46. A flat or straight type cantilever leaf spring, without C-shaped portion 178, may be used, but the C-shaped loop at 178 is preferred because it provides additional loading and braking force against flywheel 46 and because such force may be more easily calibrated according to the size of the loop, i.e. the degree of arcuate curvature thereof.

Figure 4:
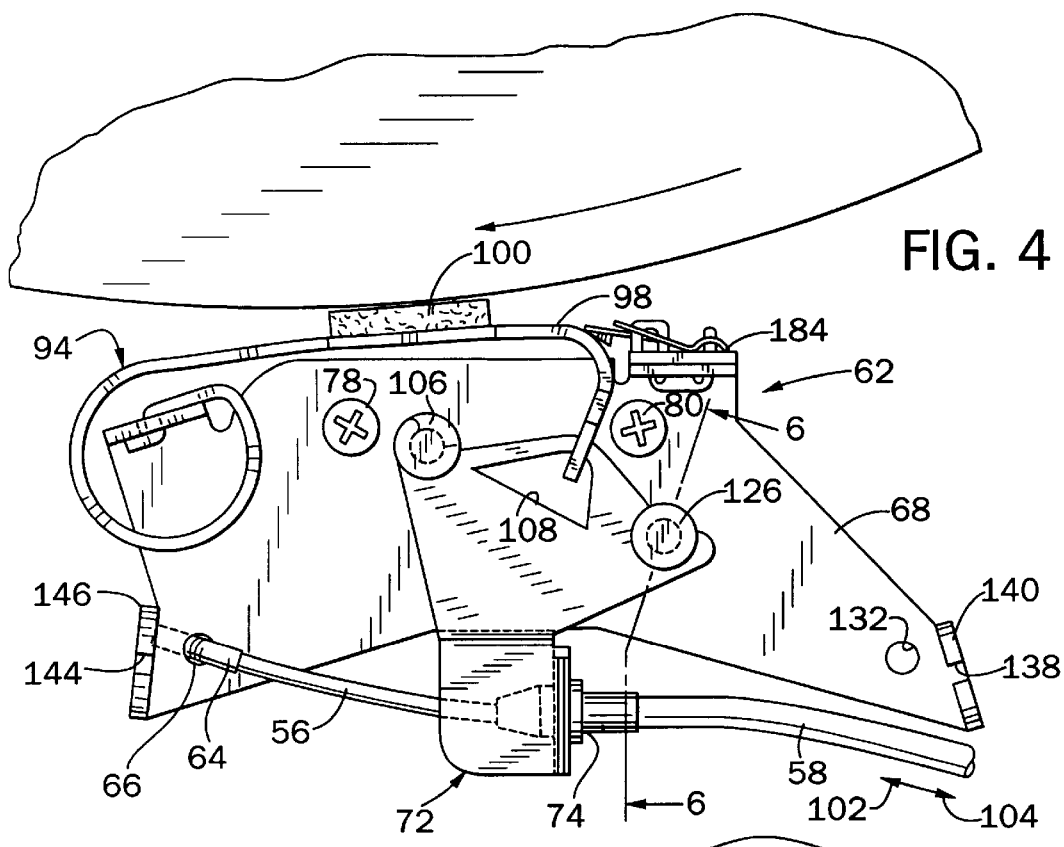
FIG. 4 is an enlarged view of a portion of FIG. 3 and shows a braking position.
Figure 5:
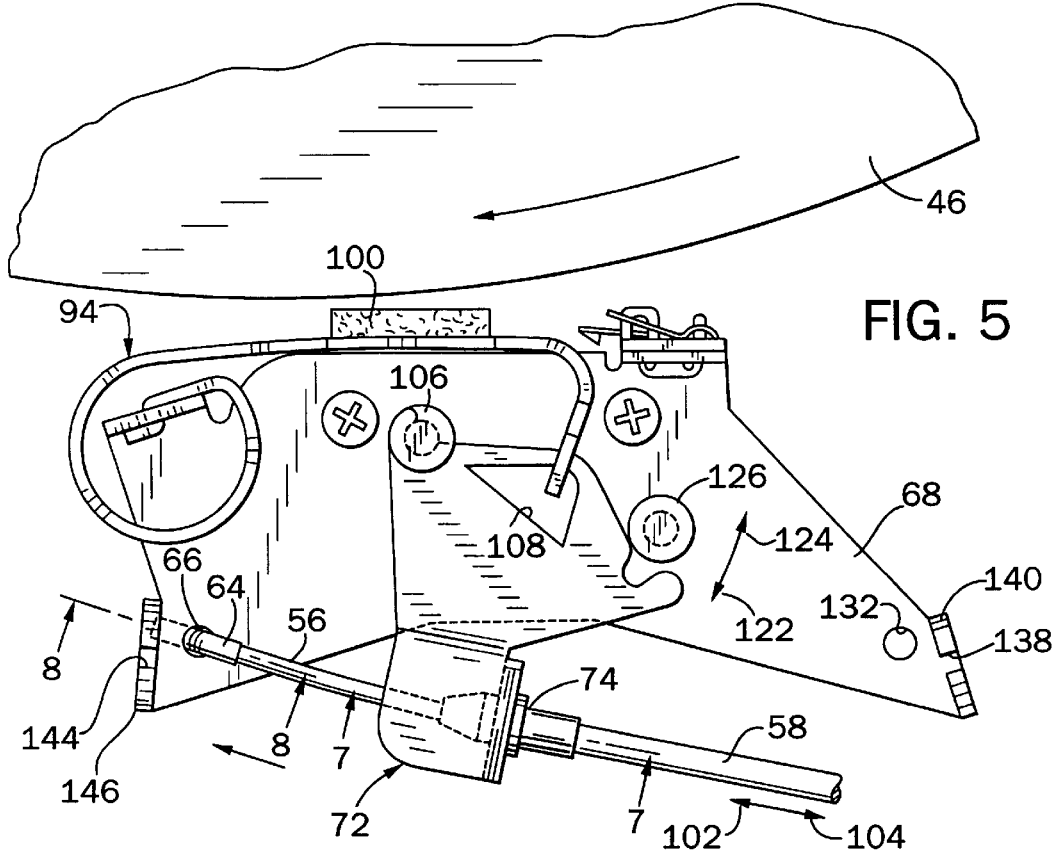
FIG. 5 is a view like FIG. 4 and shows a released non-braking position.

Bracket 68 has another integrally turned stanchion 182, FIG. 9, extending therefrom and providing a mounting platform mounting an ignition kill switch 184 having a ground contact arm 186 engaged by distal end 98 of cantilever leaf spring 94, FIG. 4, when brake pad 100 engages flywheel 46. The engine ignition circuit 188, FIG. 3, has a grounding wire 190 connected to ignition kill switch 184 at pincher connection 192, FIG. 9. The ignition kill switch includes an electrically insulating base 194 on mounting platform 182 and electrically isolating electrical conductor 196 therefrom. Electrical conductor 196 includes a first spring member 198 engaging wire 190 at pincher hole connection 192, and a second flexible leaf portion 186. When brake pad 100 is disengaged from flywheel 46, distal end 98 of cantilever leaf spring 94 is separated from leaf portion contact arm 186 of the ignition kill switch, and hence switch 184 is in an open circuit condition, and the engine spark plug fires or discharges in normal manner. When brake pad 100 engages flywheel 46, FIG. 4, distal end 98 of cantilever leaf spring 94 engages flexible leaf portion 186 of electrical conductor 196. This completes an electric circuit from wire 190 through flexible leaf portion 198 of electrical conductor 196 to flexible leaf portion 186 to ground through cantilever leaf spring 94, such that the ignition circuit is connected to ground, bypassing the spark plug, such that the latter does not fire. In this manner, the engine stops delivering rotational power to flywheel 46 at the same time the latter is braked by brake pad 100.

It is recognized that various equivalents, alternatives and modifications are possible within the scope of the append claims.

What is claimed is:

1. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member;

a transfer member mounted to said bracket and connected to said cable system and to said cantilever leaf spring and translating movement of said cable system into movement of said distal end of said cantilever leaf spring;

wherein:

said transfer member pivots on said bracket;

said transfer member is a double pivot member pivoting on said bracket at a first pivot point, and pivoting on said bracket at a second pivot point spaced from said first pivot point;

said transfer member pivots on said bracket in one rotational direction at said first pivot point moving said distal end of said cantilever leaf spring away from said rotating member such that said brake pad disengages said rotating member;

said transfer member pivots on said bracket in the opposite rotational direction at said first pivot point permitting said distal end of said cantilever leaf spring to move toward said rotating member such that said brake pad engages said rotating member;

said transfer member pivots on said bracket in said opposite rotational direction at said second pivot point moving said distal end of said cantilever leaf spring away from said rotating member such that said brake pad disengages said rotating member;

said transfer member pivots on said bracket in said one rotational direction at said second pivot point permitting said distal end of said cantilever leaf spring to move toward said rotating member such that said brake pad engages said rotating member;

said bracket includes first cable guide structure guiding said cable system for movement in a first translational direction actuating said transfer member to pivot in said one rotational direction at said first pivot point, and guiding said cable system for movement in a second translational direction actuating said transfer member to pivot in said opposite rotational direction at said first pivot point due to the bias of said cantilever leaf spring such that said brake pad engages said rotating member;

said bracket includes second cable guide structure for guiding another cable system for movement in a direction generally opposite to said first translational direction and actuating said transfer member to pivot in said opposite rotational direction at said second pivot point, and guiding said other cable system for movement in a direction generally opposite to said second translational direction and actuating said transfer member to pivot in said one rotational direction at said second pivot point due to the bias of said cantilever leaf spring such that said brake pad engages said rotating member;

and comprising a first trunnion mounted to said bracket and providing said first pivot point, and a second trunnion mounted to said bracket and providing said second pivot point, and wherein said cantilever leaf spring extends beyond said brake pad to said distal end and then turns at said distal end away from said rotating member and is connected to said transfer member at a point between said first and second trunnions.

2. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member;

a transfer member mounted to said bracket and connected to said cable system and to said cantilever leaf spring and translating movement of said cable system into movement of said distal end of said cantilever leaf spring, wherein said transfer member is pivotally mounted to said bracket and pivots about a pivot point, said cantilever leaf spring includes said root end mounted to said bracket, and an extension span extending from said root end to said distal end, and wherein said distal end extends from said extension span and is bent and turned in a direction away from said rotating member and is connected to said transfer member, said bracket includes cable guide structure comprising a cable guide passage formed in said bracket, and wherein said pivot point of said transfer member is between said cable guide passage and the point of connection of said turned distal end of said cantilever leaf spring to said transfer member.

3. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member, wherein said bracket includes cable guide structure guiding said cable system for movement in said first direction, and guiding said cable system for movement in said second direction, and wherein said bracket comprises an integral member having first and second integrally turned stanchions extending therefrom and forming first and second cable guide passages.

4. The brake according to claim 3 wherein said bracket has a third integrally turned stanchion extending therefrom and providing a mounting platform mounting said cantilever leaf spring.

5. The brake according to claim 4 wherein said bracket has a fourth integrally turned stanchion extending therefrom and providing a mounting platform mounting an ignition kill switch having a ground contact arm engaged by said cantilever leaf spring when said brake pad engages said rotating member.

6. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member, wherein said bracket includes cable guide structure guiding said cable system for movement in said first direction, and guiding said cable system for movement in said second direction, and wherein said bracket comprises an integral member having first and second integrally turned stanchions extending therefrom, said first stanchion forming a cable guide passage, said second stanchion forming a mounting platform mounting said cantilever leaf spring.

7. The brake according to claim 6 wherein said first and second stanchions are integrally turned along first and second nonparallel bend lines.

8. The brake according to claim 6 wherein said bracket has a third integrally turned stanchion extending therefrom and forming a second cable passage, said first, second and third stanchions being integrally turned along first, second and third bend lines nonparallel to each other.

9. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member, wherein said bracket has mounting structure mounting said root end of said cantilever leaf spring comprising a platform having a slot therethrough, and said root end of said cantilever leaf spring has a shallow S-shape having a first segment extending along said platform, a second segment extending through said slot, and a third segment extending along said platform, and wherein said third segment extends beyond said platform to said distal end of said cantilever leaf spring.

10. The brake according to claim 9 wherein said platform has a first side facing toward said rotating member, and a second side facing away from said rotating member, and wherein said first segment of said shallow S-shaped root end of said cantilever leaf spring extends along said second side of said platform, and said third segment of said shallow S-shaped root end of said cantilever leaf spring extends along said first side of said platform.

11. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member, wherein said cantilever leaf spring root end is attached to said bracket at a mounting platform, and said cantilever leaf spring extends along a curve from said root end and loops around said mounting platform and then extends to said brake pad.

12. The brake according to claim 11 wherein said cantilever leaf spring extends beyond said brake pad to said distal end and then turns at said distal end away from said rotating member and extends toward the axis of movement of said cable system.

13. The brake according to claim 12 wherein said cable system is coupled to said cantilever leaf spring by a transfer member pivoting on said bracket and engaging said cable system and said turned away portion of said cantilever leaf spring.

14. A brake for a rotating member driven by a power source, comprising:

an attachment bracket;

a cantilever leaf spring having a root end mounted to said bracket, and a distal end movable toward and away from said rotating member;

a brake pad attached to said cantilever leaf spring and normally engaging said rotating member;

a cable system coupled to said cantilever leaf spring and movable in a first direction moving said distal end of said cantilever leaf spring away from said rotating member such that said brake pad disengages said rotating member, and movable in a second direction permitting said distal end of said cantilever leaf spring to move toward said rotating member such that said brake pad engages said rotating member, wherein said cantilever leaf spring comprises a C-shaped portion extending from said root end initially away from said rotating member and then curled around said root end and extending between said rotating member and said root end to an extension span extending to said distal end, wherein said extension span extends parallel to a tangent of an arc of rotation of said rotating member, and wherein said brake pad is attached to said extension span, and wherein said bracket has mounting structure mounting said root end of said cantilever leaf spring comprising a platform having a first side facing said rotating member, and a second side facing away from said rotating member, and wherein said C-shaped portion extends from said root end initially toward said distal end and then is curved in a loop away from said distal end and facing and spaced from said second side of said platform and then around said platform and then extending back toward said distal end and facing and spaced from said first side of said platform between said platform and said rotating member.

15. A brake for a rotating member driven by a power source, comprising:

an attachment bracket;

a cantilever leaf spring having a root end attached to said bracket, and a distal end movable toward and away from said rotating member;

a brake pad attached to said cantilever leaf spring and normally engaging said rotating member;

a transfer member pivotable on said bracket in one rotational direction moving said distal end of said cantilever leaf spring away from said rotating member such that said brake pad disengages said rotating member, and pivotable in the opposite rotational direction permitting said cantilever leaf spring to move due to its own bias toward said rotating member such that said brake pad engages said rotating member due to said bias of said cantilever leaf spring;

a cable system attached to said transfer member and movable in a first translational direction to pivot said transfer member in said one rotational direction, and movable in a second translational direction permitting said transfer member to pivot in said opposite rotational direction, wherein said cantilever leaf spring comprises a first segment extending generally parallel to a tangent of an arc of rotation of said rotating member and having said brake pad attached thereto, and a second segment extending from said distal end away from said rotating member and engaged by said transfer member.

16. A brake for a rotating member driven by a power source, comprising an attachment bracket, a brake shoe having a brake pad for engaging said rotating member, a biasing member normally biasing said brake pad into engagement with said rotating member, a cable system coupled to said brake shoe and movable in a first direction moving said brake pad away from said rotating member, and movable in a second direction permitting said biasing member to move said brake pad into engagement with said rotating member, a transfer member mounted to said bracket and connected to said cable system and to said brake shoe and translating movement of said cable system into movement of said brake shoe, said transfer member being a double pivot member pivoting on said bracket at a first pivot point, and pivoting on said bracket at a second pivot point spaced from said first pivot point, said transfer member pivoting on said bracket in one rotational direction at said first pivot point moving said brake shoe away from said rotating member such that said brake pad disengages said rotating member, said transfer member pivoting in the opposite rotational direction at said first pivot point permitting said brake shoe to move toward said rotating member such that said brake pad engages said rotating member, said transfer member pivoting on said bracket in said opposite rotational direction at said second pivot point moving said brake shoe away from said rotating member such that said brake pad disengages said rotating member, said transfer member pivoting on said bracket in said one rotational direction at said second pivot point permitting said brake shoe to move toward said rotating member such that said brake pad engages said rotating member, and a cantilever leaf spring having a root end mounted to said bracket, and a distal end movable toward and away from said rotating member, said brake pad being attached to said cantilever leaf spring and normally engaging said rotating member, said cantilever leaf spring comprising said brake shoe and said biasing member.

* * * * *